United States Patent
Stummer

(10) Patent No.: US 6,843,351 B2
(45) Date of Patent: Jan. 18, 2005

(54) SYSTEM FOR BRAKING CONTROL IN A VEHICLE INCLUDING A MULTI-COMBINATION VEHICLE

(76) Inventor: Mark J. Stummer, 12 Canonbury Circuit, Driver, Northern Territory (AU), 0830

( * ) Notice: Subject to any disclaimer, the term of this patent is extended or adjusted under 35 U.S.C. 154(b) by 0 days.

(21) Appl. No.: 10/637,902

(22) Filed: Aug. 8, 2003

(65) Prior Publication Data

US 2004/0090118 A1 May 13, 2004

(30) Foreign Application Priority Data

Nov. 8, 2002 (WO) .............................. PCT/AU02/01514

(51) Int. Cl.[7] .............................................. F02D 9/06
(52) U.S. Cl. ..................................... 188/273; 180/14.2
(58) Field of Search ......................... 188/273; 123/320, 123/323; 701/54, 93, 96, 112; 180/14.1, 14.2

(56) References Cited

U.S. PATENT DOCUMENTS

| | | | | |
|---|---|---|---|---|
| 4,505,347 A | * | 3/1985 | Prechtel ...................... | 180/14.2 |
| 5,772,554 A | * | 6/1998 | Tabata ........................ | 477/109 |
| 6,354,266 B1 | * | 3/2002 | Cornell et al. .............. | 123/322 |
| 6,536,408 B1 | * | 3/2003 | Warner ....................... | 123/323 |
| 6,652,414 B1 | * | 11/2003 | Banks, III ................... | 188/273 |

FOREIGN PATENT DOCUMENTS

| | | |
|---|---|---|
| DE | 19524990 A9 | 2/1996 |
| DE | 19901105 A1 A1 | 7/2000 |
| EP | 25025 A2 | 3/1981 |
| EP | 875698 B1 | 7/2002 |

* cited by examiner

Primary Examiner—Thomas Williams
(74) Attorney, Agent, or Firm—Francis Law Group

(57) ABSTRACT

A braking system for the control of vehicle speed, the vehicle including an engine having a first plurality of engine cylinders, an electronic throttle, electrical power source and engine brake adapted to provide engine braking, comprising an electronic control unit in communication with the engine electrical power source, engine throttle and engine brake, and a speed sensor adapted to measure the speed of the vehicle and communicate the measured vehicle speed to the electronic control unit, wherein when the measured vehicle speed is greater than a pre-determined vehicle speed threshold, the electronic control unit disables the engine throttle and applies the engine brake using a second plurality of the engine cylinders, the second plurality of engine cylinders being less than the first plurality of engine cylinders.

19 Claims, 8 Drawing Sheets

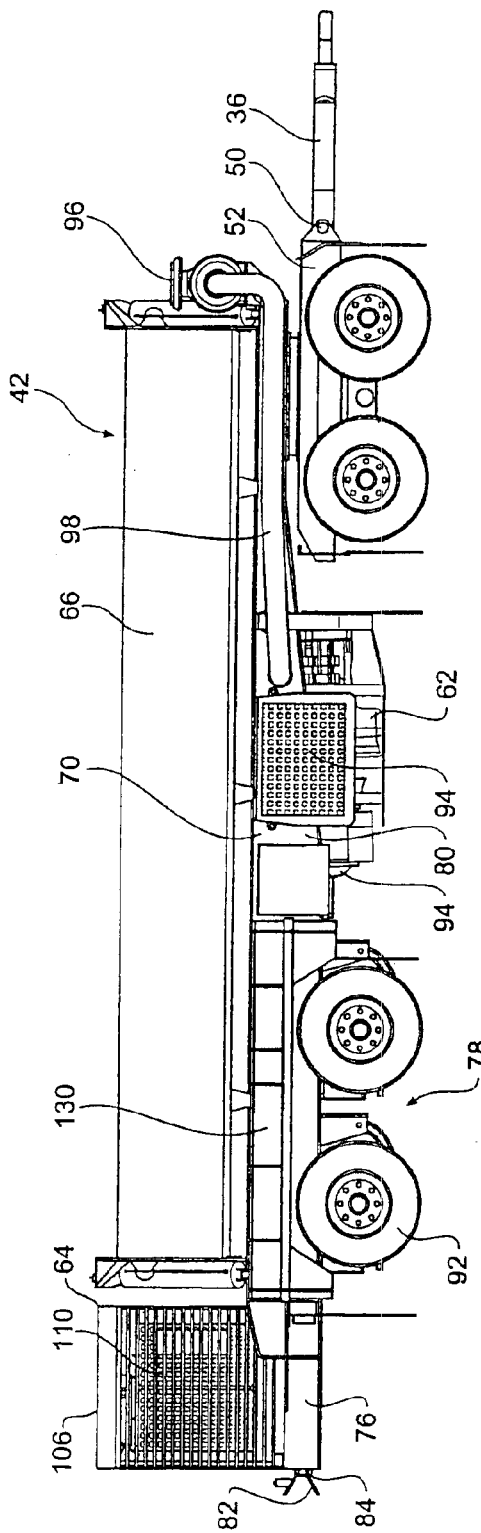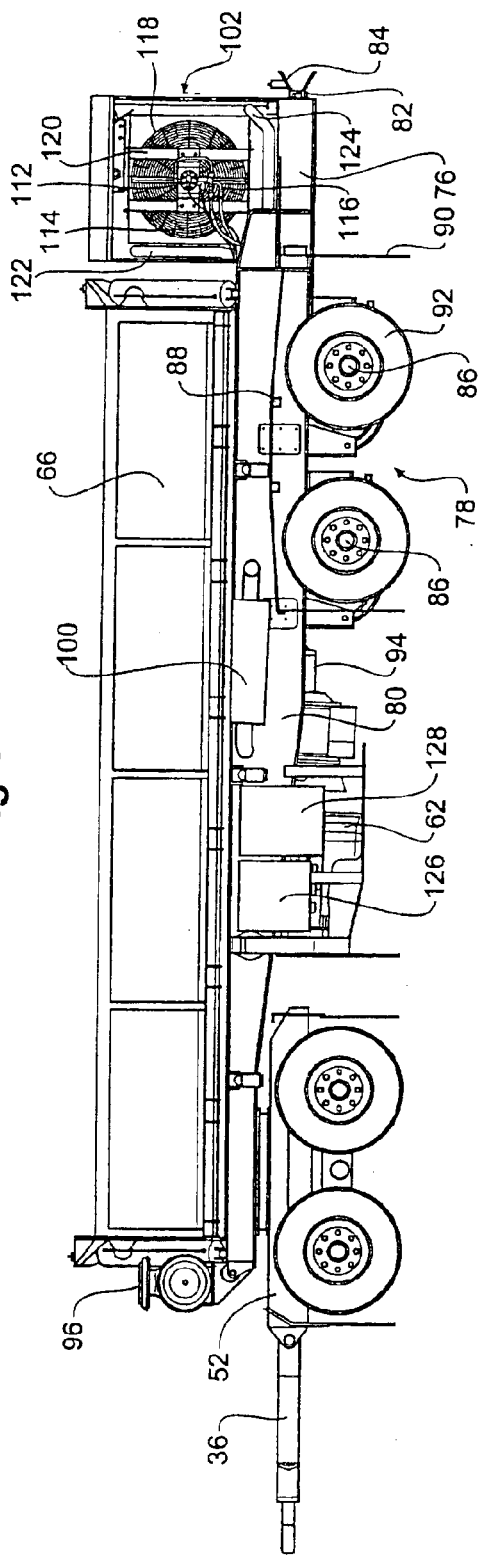

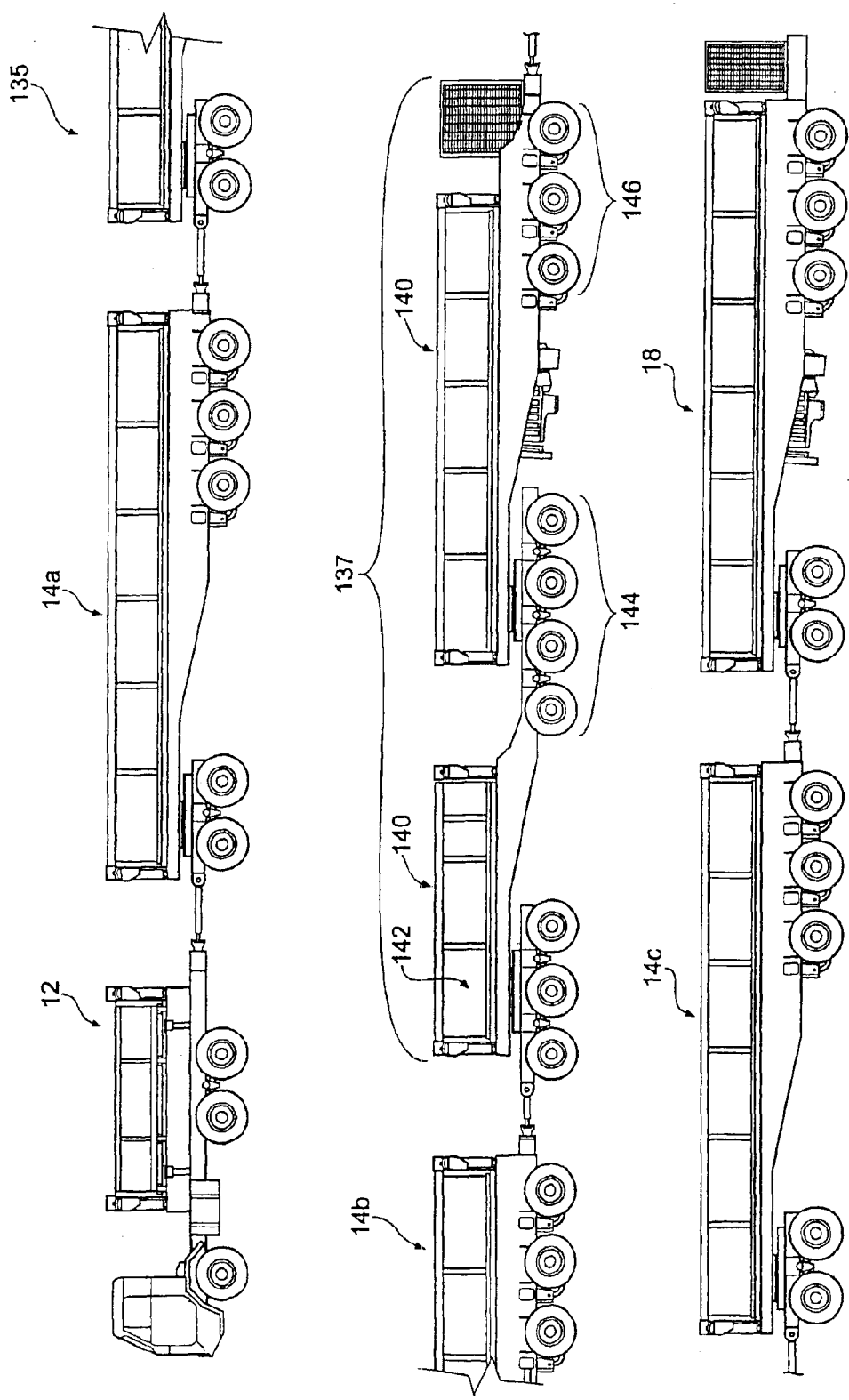

SYSTEM FOR BRAKING CONTROL IN A VEHICLE INCLUDING A MULTI-COMBINATION VEHICLE

CROSS REFERENCE TO RELATED APPLICATION

This application is filed pursuant to 35 U.S.C. §371 as a United States National Phase Application of International Application No. PCT/AU02/01514, filed Nov. 8, 2002.

FIELD OF THE INVENTION

The present invention is directed to a vehicle braking system, and more particularly, to a system for velocity dependant controlled braking in a vehicle, such as a multi-combination vehicle being particularly useful in hauling mined payload from mines.

BACKGROUND OF THE INVENTION

Operators of mines are constantly searching for ways to reduce the costs associated with mined products. One of the most significant costs in operating a mine is transporting the mined material from the ore face to a processing plant. This is exacerbated when the mined payload is of low grade, that is, the desired mineral or metal is only a small percentage by weight and/or volume of the mined ore so that substantial amounts of ore have to be handled to extract a small percentage of desired material. A further problem that occurs is where the ore has to be handled several times.

There are several ways that ore can be transported from the ore face to the processing plant, depending on the type and configuration of the mine.

Underground mines typically have a central lifting or winding shaft to bring the mined ore to the surface. These shafts require a dedicated receival point. To get the ore to that point mines typically have a dedicated rail system that is level and route specific. Underground mine haulage or dump trucks are used to transport the ore from various mining levels both above and below the rail haulage level to the dedicated rail system that then transports the ore to the lifting shaft receival point. The trucks are always a single unit that is either rigid or pivot steer. This type of arrangement has a number of distinct disadvantages.

The dump trucks cause a significant amount of hot air per ton of ore hauled to be exhausted into the mine. Cold ventilation air has to be continually pumped into the mine via ventilation shafts, and one of the major costs in establishing underground mines is the construction and drilling of ventilation shafts. Because of the limitation of currently known dump trucks, the time that they can operate underground is limited, particularly due to excess heat they produce. To reduce the heat, the dump trucks have to move relatively slowly.

A railway system, especially one underground, is relatively expensive to install and operate due to the cost of acquiring the locomotive and installing the fixed railway system and the associated maintenance costs. Furthermore the underground railway system being route-specific is not flexible to changes in route without incurring the expense of installing additional railway tracks. As each new mining area opens, it is necessary to incur the cost of installing new track for the railway system, or use the dump trucks as described above whose efficiency decreases with increasing distances they have to travel.

The central lifting or winding shaft is quite expensive, the cost running into tens of millions of dollars and is of a fixed location. As the mine expands the distance from the ore face to the central shaft becomes important in the cost of operating the mine.

In some instances mines have utilized conveyor belts instead of the railway system and/or the lifting shaft. The difficulty with conveyor belts is that once again they are route specific, are quite expensive to install and maintain. Miners are also concerned that the belts may catch fire that would starve the area of oxygen.

In some instances the dump trucks may be used to transport the ore directly above ground. Because of the limitations described above, especially low speed and the heat they produce and with the inclination within underground mines generally being constant, the depth of a mine that can be realistically accessed by these dump trucks is therefore limited, typically to a depth of hundreds of meters.

When the ore has been transported to the surface, or in the case of an above ground mine, it is then necessary to transport the ore to a central processing plant.

One of the ways that this may be accomplished is by using conventional off-highway dump trucks that can either be a single rigid, pivot steer unit or an articulated vehicle consisting of a very short wheelbase earthmoving type or tractor unit coupled to a single hauled or carrying unit and virtually job specific. These units are designed to be a link in the chain of the actual mining, digging or producing the/any product. Their main function is to move product literally from the ore face to a receival point through the shortest possible distance are not route-specific. The shorter the route the more economical they are, conversely, their tonne of ore transported per distance costs increase dramatically over longer routes. They are therefore not suitable for hauling ore great distances, thereby limiting the distance that ore can be transported at a reasonable cost. As such, these trucks are not suitable when there may be satellite mines, that is, mines that are some distance away from the processing plant. In particular, these trucks have never been designed to be a transportation system for various reasons including the following:

(a) Their axle loadings are extreme and require appropriate roading and bridging. Wheeled or articulated dump trucks with large tires carry a significant loading per axle, up to 33 tons per axle.

(b) These types of trucks being designed for hauling loads over relatively short distances and rough terrain are therefore designed with relatively large tires for relatively slow speed operation and are relatively expensive to operate and maintain due to fuel and tire costs.

(c) They produce too much heat in both their drive trains and tires. Furthermore they have poor power-to-weight ratios and low operating efficiencies.

(d) Their mass requires a large cross-section both in height and width.

(e) Their discharge methods are either: direct end tip (non captive) where the center of gravity is always raised, or bottom dump in the single articulated hauling vehicle that keeps the center of gravity down but is discharge captive.

An alternate way of transporting the ore to a central processing plant includes conventional type transportation system such as conveyor belts and rail systems, both routes being captive. Problems with these have been discussed above.

Another way of transporting the ore is using highway type road vehicle combinations or multi-combination vehicles. These vehicles are limited by their horsepower, tractive or braking efforts or capacities, manufacturers ratings of various componentry, directional stability behavior, swept path characteristics, gradability and startability.

As a result, currently known systems for the extraction of ore from mines set limits on the commercial usefulness of mines simply due to the cost of transporting the ore.

As discussed above multi-combination vehicles, such as over-the-road vehicles are known and include a truck coupled to a plurality of trailers and converter dollies. Until recently these vehicles have included a single power source, generally a diesel engine, with the vehicles being limited to a payload of some 170 tonnes, and a gradient not exceeding 5%. These multicombination vehicles, commonly referred to as "road-trains" have been in use for some time, particularly in Australia, for the purpose of hauling mined products, or the commodities of other industries, over aboveground roadways. Conventional aboveground road-trains are typically designed for use at relatively high speed and on relatively flat ground. They are limited by their horse power, tractive or braking efforts and their capacities that are defined by manufacturers ratings, directional stability behaviour, swept path characteristics, gradability and startability. Accordingly they have limited uses for operation in mines.

The location of the mechanical couplings between each adjacent pair of vehicles in a multi-combination vehicle as described above is positioned to maintain the side-to-side sway, or yaw, of the last vehicle within acceptable limits for aboveground, over-the-road applications, but is not compatible for operation within an underground mine due to the relatively low operating speeds as well as the relatively narrow tunnels and small radius bends experienced in underground mines.

Specially configured multi-combination vehicles have been developed recently which have a significantly reduced swept path width as compared to conventional aboveground road-trains. This enables these vehicles to be used to transport various payloads such as mined ores, over the roadways existing in an underground mine. U.S. Pat. No. 6,062,801 issued on May 16, 2000 and U.S. Pat. No. 6,361,269 issued on Mar. 26, 2002, each expressly incorporated by reference herein in its entirety, describe these specially configured multi-combination vehicles which may be used in underground mines. The vehicles can operate in a tunnel system with restricted height, width, swept paths and directional path complying with a predetermined behaviour pattern obviating the need for the rail or conveyor system.

Even after the advent of the foregoing specially configured multi-combination vehicles, various operational problems remained to be solved with regard to the transport of mined ores, in both underground and aboveground applications. For instance, due to the heavy loads of the road-train combination, the traction provided by the powered wheels of a road-train, usually provided to two rear axles, was insufficient to satisfactorily negotiate the gradients associated with the declines providing ingress and egress to and from some underground mines. Alternatively these declines into underground mines would have to be constructed at a much gentler slope leading to excessively long tunnels. In addition, the relatively low speed of the road trains underground due to the size of the tunnels and safety considerations result in road-trains travelling underground for a significant length of time, even up to an hour in some cases. This places strain on the road-train cooling system that is typically designed for aboveground road-trains travelling at significant speeds, generally around 80 km/h and the engines are prone to overheating.

Also, before the introduction of multi-combination vehicles incorporating a power trailer (i.e., one having a source of motive power), which are subsequently discussed in detail, multi-combination vehicles for dedicated road haulage therefor such as mineral concentrate haulage operated at a 170 tonne payload, as noted previously. However, there is a practical limit to the payload of the multi-combination vehicle with a single truck. Since the cost of haulage is determined mainly on weight, if one can increase the total haulage that can be moved by a single vehicle that does not require additional operators, the cost benefit is substantial especially. This is especially so if ore can be hauled directly from within a mine to a processing plant without needing to be reloaded onto another transport system.

In order to further improve multi-combination vehicles and provide even greater advantages to the operators using these vehicles, multi-combination vehicles have been developed which utilize a truck and an additional motive power source advantageously located within the chassis of a trailer and including a unique cooling system that enables operation of the multi-combination vehicle at low speeds, on steeper gradients and with a greater payload than previously known. International Patent Application No. PCT/AU01/01154, expressly incorporated by reference herein in its entirety, discloses a multi-combination vehicle including a power trailer having an engine that overcomes the foregoing problems of traction and cooling of such multi-combination vehicles. International Patent Application No. PCT/AU01/01568, also expressly incorporated by reference herein in its entirety, discloses various features that may be incorporated in the drive trains of multi-combination vehicles of this type. These multi-combination vehicles having the ability to transverse different mining levels have removed the need for conventional dump truck haulage from the ore face to the rail head, and have also enabled the vehicle to haul ore directly from the ore face from any level underground via an access tunnel directly to a processing plant eliminating the need for the lifting shaft. Furthermore, these types of multi-combination vehicles coupled with specifically configured power trailers, typically B-double trailers, can be used above ground to transport ore directly to a processing plant eliminating the need for other dump trucks, increasing the total payload from some 170 tonnes to 270 tonnes whilst staying within the manufacturers rating and at the same time increasing the general behavior pattern creating a safer multi-combination vehicle.

Use of a multi-combination vehicle using a truck and a power trailer provides a further significant advantage over conventional single-engine dump trucks, as well as multi-combination vehicles having only a truck, in that even if the truck or power trailer engine or transmission were to fail, the alternative engine and transmission can be used to at least move the multi-combination vehicle out of the way or even bring it to the surface for analysis and repair. As known in the art, in the event of engine and/or transmission failure it is more than a simple exercise to retrieve a single-engine dump truck from the depths of an underground mine that is then blocking the underground road for use by other trucks. A similar problem may exist with multi-combination vehicles powered only by a single truck, or in some instances a single prime mover.

One of the problems in a multi-combination vehicle having two engines and transmissions is controlling them. International Patent Application No. PCT/AU02/00667, expressly incorporated by reference herein in its entirety, discloses a system for the control of multiple engines in a multi-combination vehicle including a power trailer having an engine, which overcomes the foregoing problems of controlling multiple engines. International Patent Application No. PCT/AU02/00668, also expressly incorporated by reference herein in its entirety, discloses a system for the control of multiple transmissions in a multi-combination vehicle including a power trailer having an engine, which overcomes the foregoing problems of controlling multiple transmissions.

A difficulty in a load carrying vehicles and especially in relation to multi-combination vehicles as described above is that the terminal speed of the vehicle has to be a carefully controlled parameter especially when it is carrying a load or descending into a mine. If the vehicle is travelling too fast down into a mine the brakes overheat and become ineffective. The problem is even greater in the case where there are multi-combination vehicles and where the power trailer effectively keeps pushing the truck.

The driver of the vehicle may select engine braking, when be experience they think that the vehicle is travelling at a too fast velocity. This relies on the operating skill of the driver and is affected by driver fatigue and concentration. Where engine braking is not applied in time, the vehicle can run out of control potentially damaging the vehicle, the mine and threaten the life of people in the vicinity. In fact, runaway vehicles are one of the more common reasons for damage and disruption in a mine. This problem is exacerbated by the fact that in currently known engine braking systems the engine braking will only apply when the throttle is not engaged. If the driver, for whatever reason, is still applying a throttle even if they select engine braking it will not be activated. In the worst-case scenario where the driver looses consciousness and is still applying a throttle the vehicle will not stop or slow down of its own accord.

The present invention seeks to redress the above-mentioned problems by providing for a vehicle engine braking system wherein the throttle is inhibited and engine braking applied once the vehicle speed reaches a pre-determined velocity. The present invention further seeks to redress the aforementioned problems by providing for a system for the velocity control of a multi-combination vehicle where the operator can select the relative braking applied by the power trailer and the truck wherein the trailer always applied engine braking that is equal to or greater than that supplied by the truck. The present invention seeks even further to redress the aforementioned problems by providing for a variable velocity engine braking system wherein once the speed of the vehicle falls below the pre-determined threshold, throttle control is enabled whilst engine braking is turned off.

The inventor is unaware of any vehicle including a multi-combination vehicle, whether it is for above ground or underground use of the type just described, which is capable of applying engine braking only dependant on the speed of the vehicle. The inventor is further unaware of any multi-combination vehicle where the operator can select the relative engine braking of the truck and power trailer.

In view of the foregoing disadvantages and limitations associated with known load-carrying vehicles, a commercial need exists for an improved load-carrying vehicle and vehicle combination for use both aboveground and in underground mines that overcomes at least some of the above-mentioned problems or provides the public with a useful alternative.

It is therefore an object of the present invention to provide a braking system for a vehicle that overcomes the above noted drawbacks and disadvantages associated with prior art vehicle braking systems.

It is another object of the present invention to provide a braking system for velocity dependent controlled braking for a vehicle.

It is another object of the present invention to provide a braking system for velocity dependent controlled braking system for a multi-combination vehicle having a powered truck and a powered trailer.

It is yet another object of the present invention to provide a braking system for a vehicle that includes a manual override control that enables an operator of the vehicle to apply variable engine braking independent of the vehicle speed.

SUMMARY OF THE INVENTION

In accordance with the above objects and those that will be mentioned and will become apparent below, the system for braking control in a vehicle having an engine with a first plurality of engine cylinders, an electronic throttle, electrical power source and engine brake adapted to provide engine braking in accordance with this invention comprises an engine having a first plurality of engine cylinders, an electronic throttle, electrical power source and engine brake adapted to provide engine braking, an electronic control unit, that is in communication with the engine electrical power source, engine throttle and engine brake, and a speed sensor adapted to measure the speed of the vehicle and communicate the measured vehicle speed to the electronic control unit, wherein when the measured vehicle speed is greater than a pre-determined vehicle speed threshold, the electronic control unit disables the engine throttle and applies the engine brake using a second plurality of the engine cylinders, the second plurality of engine cylinders being less than the first plurality of engine cylinders.

Preferably, when the measured vehicle speed falls to or below the pre-determined vehicle speed, the electronic control unit enables the engine throttle and disengages the engine brake.

Preferably, the electronic control unit includes a manual override control having two selections that enables an operator of the vehicle to apply variable engine braking independent of the vehicle speed; the first selection providing engine braking on only some of the engine cylinders and the second selection providing engine braking on all of the cylinders of the engine.

In a further embodiment of the invention, the system for braking control in a multi-combination vehicle having at least two engines that are controlled by a single electronic throttle, each engine being operable to effect engine braking and having a first plurality of engine cylinders, an electrical power source and an engine brake, comprises an electronic control unit, that is in communication with at least one of said engines' electrical power source, the electronic throttle and the engine brake of each of the engines, and a speed sensor adapted to measure the speed of the vehicle and communicate the measured vehicle speed to the electronic control unit, wherein when the measured vehicle speed is greater than a pre-determined vehicle speed threshold, the electronic control unit disables the engine throttle and applies at least one the engine brakes to the engines.

Preferably, the multi-combination vehicle includes a powered truck and a powered trailer, the engine braking being applied by engines of both the truck and trailer engines.

Preferably, the electronic control unit similarly includes a manual override control having two selections that enables an operator of the vehicle to apply engine braking independent of the vehicle speed; in both selections engine braking is provided using all of the cylinders of the trailer engine, whilst in the first selection engine braking is provided by also using some of the cylinders of the truck engine and in the second selection engine braking is provided by also using all of the cylinders of the truck engine.

Preferably, the system also includes an inclination sensor adapted to measure the vehicle forward inclination and weigh the pre-determined speed at which engine braking is applied with increasing values of inclination.

Preferably, the system further includes a light sensor adapted to detect ambient light and weigh the pre-determined speed at which engine braking is applied as a function of ambient light conditions.

Preferably, the system further includes a weight sensor adapted to determine the weight of at least the truck and weight the pre-determined speed at which engine braking is applied as a function of weight of the truck.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 4 is a right side elevation plane view of the power trailer shown in FIG. 2;

FIG. 5 is a left side elevation plane view of the power trailer shown in FIG. 2;

FIG. 6 is a side elevation plane view of a further embodiment of a multi-combination vehicle;

DESCRIPTION OF THE PREFERRED EMBODIMENT

It is to be understood that although the following description discusses the present invention when applied to a multi-combination vehicle it equally applies to a single chassis vehicle of the type that may currently be used to transport loads. It is not the intention of the following description to therefore limit the invention in any way to multi-combination vehicle, although it is to be understood that it is particularly useful in those types of vehicles.

Figure 1:
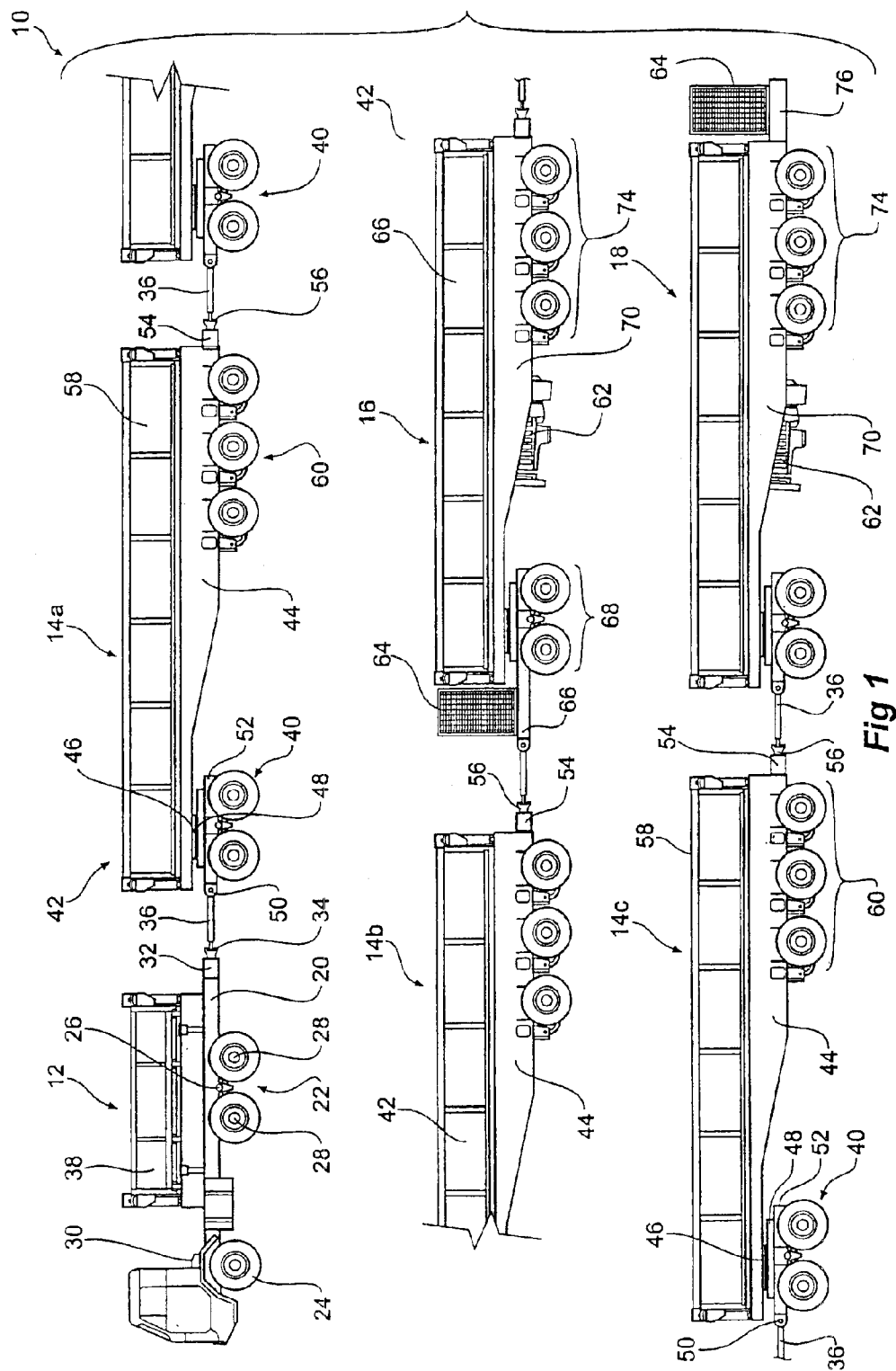
FIG. 1 is a side elevation plane view of one embodiment of a multi-combination vehicle having several vehicle trailers and several power trailers.
Figure 2:
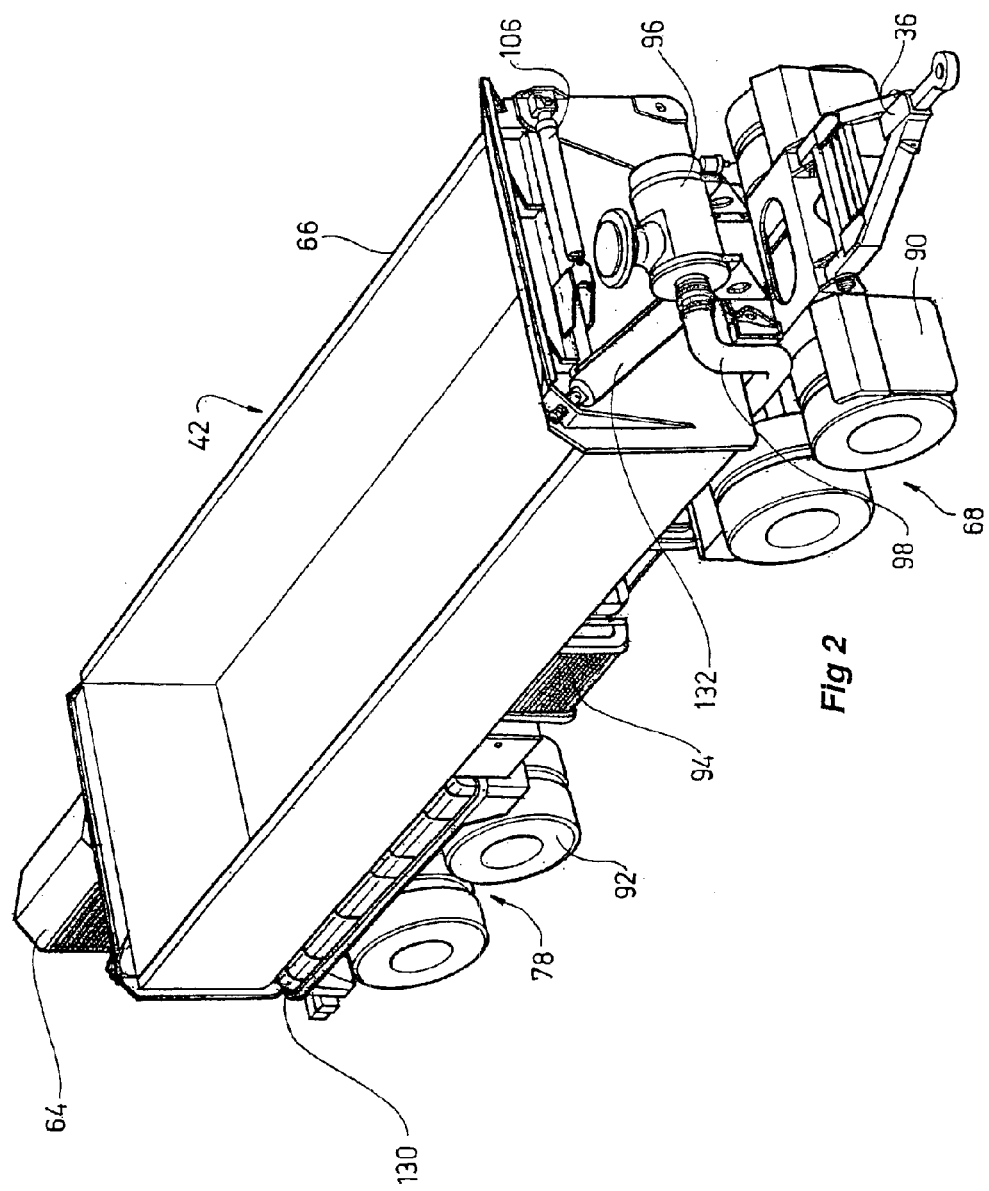
FIG. 2 is a front perspective view of a power trailer for a multi-combination vehicle.
Figure 3:
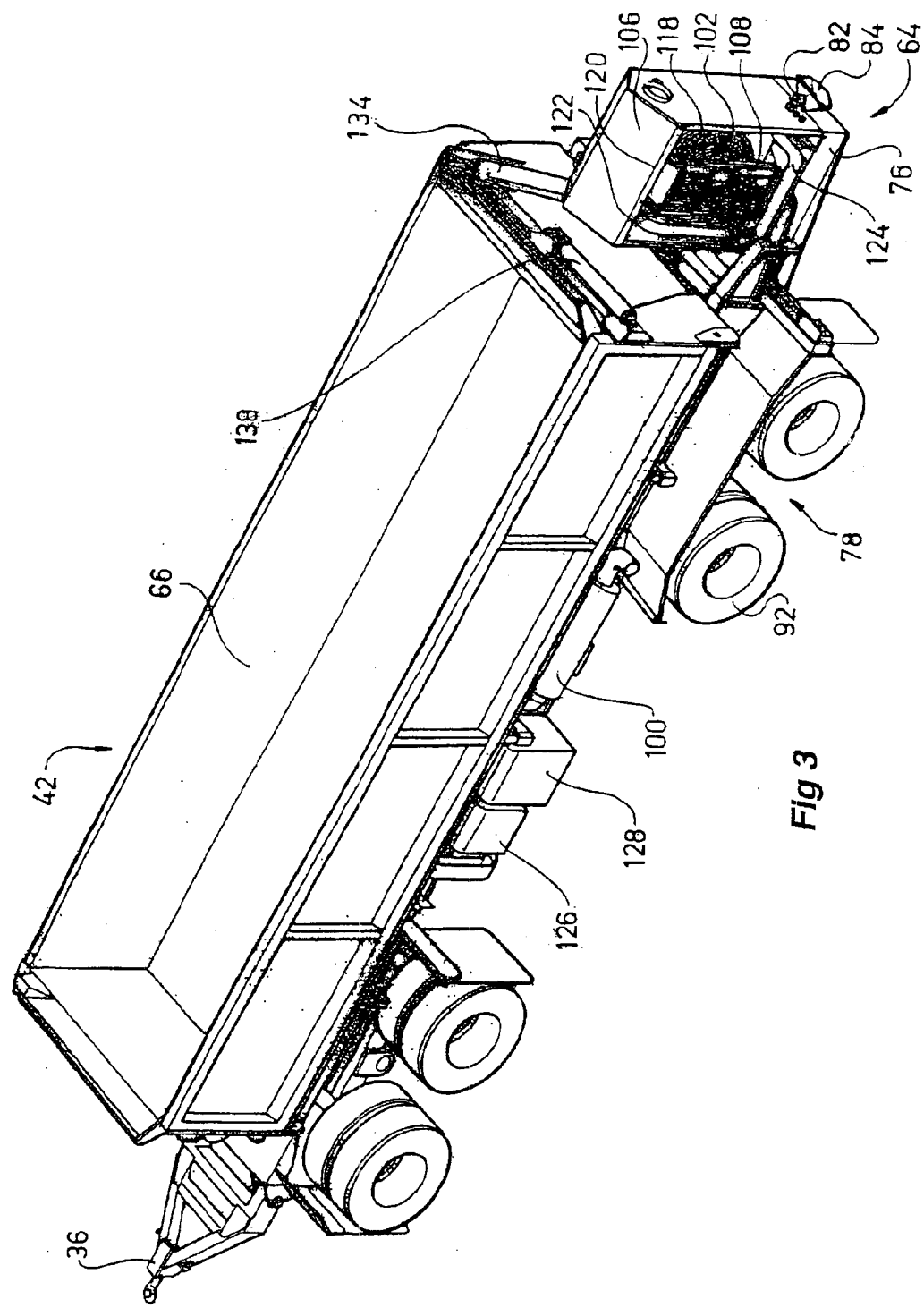
FIG. 3 is a rear perspective view of the power trailer shown in FIG. 2.

Turning now to the drawings in detail there is shown in FIG. 1a multi-combination vehicle 10 including a truck 12 mechanically coupled to a plurality of trailers 14. A power trailer 16 extends from forwardly located trailers 14a and 14b and a further trailer 14c is coupled to the power trailer 16. A second power trailer 18 is coupled to the last trailer 14c. It is however to be understood that the multi-vehicle combination may be more power trailers and less normal trailers, depending on the application, the biggest change in configuration depending on whether it is for aboveground or underground use.

The truck 12 includes a chassis or frame 20 and a rear axle assembly 22, which is suspended from and disposed below the chassis 20. Forward axle 24 comprises the steering axle of the truck 12. The rear axle assembly 22 is suspended from chassis 20 via suspension 26 and includes wheeled axles 28. Both of the wheeled axles may be driving axles, or alternatively only one is a driving axle. The driving axles may be a tridem axle assembly in lieu of the tandem axle assembly 22 and possibly suspended with a mechanical suspension.

The truck 12 further includes a motive power source 30 and a transmission (not shown) for transmitting torque from the motive power source 30 to the drive axles 28. Typically the motive power source comprises a diesel engine and the transmission for transmitting torque from the engine 30 to the drive axles 28 includes a gear box, a drive shaft, and a differential (not shown). Alternatively, the motive power source 30 may comprise other types of internal combustion engines utilizing a variety of fuels.

The truck includes a draw frame 32 attached and rearwardly extending from the chassis 20. A coupling 34 is attached to the rear of the draw frame 32 and connected with a drawbar 36 on the trailer 14a. A bin 38 accommodates payload to be carried by the truck and may be adapted to be side tipping by being hingedly attached to the frame 20 (not shown).

Each of the trailers 14a, 14b, and 14c includes a converter dolly 40 and a semi-trailer 42, said semi-trailer having a chassis 44, a forward end with a coupling system 46 that pivotably attaches to a ball-race turntable 48 on the converter dolly. This enables the converter dolly to pivot relative to the semi-trailer about a generally vertical axis of rotation passing through the center of the ball-race turntable. Other embodiments may however equally well be used, such as an oscillating ball-race turntable or a grease plate. The drawbar 36 is hingedly connected through pivot 50 to the chassis 52 of the converter dolly 40 and accommodates for any change in the grade of the road surface. As with the truck, the trailers 14a, 14b, and 14c, further include draw frames 54 attached and rearwardly extending from the chassis 44. A coupling 56 is attached to the rear of the trailer draw frames 54 and is connected with a drawbar 36 on the next trailer or power trailer. A bin 58 accommodates payload to be carried by the trailer and may be adapted to be side-tipping by being hingedly attached to the frame 52 (not shown). Each trailer includes a rear axle assembly 60 typically having three axles, the mechanical details of which are well known in the art. However in the underground application the configuration of the vehicle is a dual dolly dual axle trailer.

Power trailer 16 is coupled to trailer 14b using coupling arrangements as described above. The power trailer 16 includes the same mechanical features as with the other non-powered trailers 14a, 14b, and 14c, such as semi-trailer 42, with the addition of an engine 62 suspended generally half-way along chassis 44 and a cooling means 64 located at the front of the power trailer 16 positioned to take into account the movement necessary during a turn. Extending the chassis 66 of the power trailer dolly 68 enables the addition of the cooling means. Alternatively, although not shown and the preferred configuration, the cooling means is accommodated on the front of the chassis 70 of the power trailer by shortening the bin 72 when compared with the bin 58 of a non-powered trailer. A transmission system provides motive power to the rear axle assembly 74 of the power trailer 16.

Power trailer 18 also includes engine 62 mechanically coupled to the rear drive axle assembly 74 but includes the cooling means 64 located at the rear of the power trailer thereby eliminating the requirement for the extra length in the chassis of the dolly as was the case in power trailer 16 and instead extending the rear 76 of the chassis 70 to support the cooling means.

Referring to FIGS. 2–5, there is illustrated a power trailer such as power trailer 18 having the cooling means 64 at the rear end thereof but having a double axle rear axle assembly 78. The power trailer includes semi-trailer 42 having a chassis 70 including a rear extension 76. The chassis 70 includes a pair of longitudinally extending side members 80 and a plurality of transverse cross-members (not shown) interconnecting and attached to the side members 80. The rear axle assembly 78 is suspended from chassis 70 typically by air suspension (not shown). Alternatively the semi-trailer 42 may include a conventional mechanical spring assembly. The side members 80 support or form part of the load carrying structure such as bin 66. The load carrying structure may be a side tipping trailer, a stock crate, a fuel tank, or any other type of structure for supporting a load. As with the truck and non-powered trailers, the power trailer includes a draw frame 82 attached and rearwardly extending from the chassis 70. A coupling 84 is attached to the rear of the draw frame 82 and connected with a drawbar 36 on the next trailer or power trailer and may be adapted to be side-tipping by being hingedly attached to the frame 70 (not shown).

The rear axle wheel assembly 78 includes wheeled axles 86. Extending above said wheeled axles are members 88 that may be used to support mudguards and the like 90. The wheeled axles 86 include a plurality of tires 92 mounted thereon for supporting the semi-trailer as it travels over a road surface.

Mounted within chassis 70 is a motive power source or engine 62 suspended generally centrally between the side members 80 and centrally within the chassis 70. A transmission 94 provides driving power from the engine 62 to the axle assembly 78 where one or more of the wheeled axles 86 may be driven. The engine is typically a diesel engine and may be advantageously include a turbocharger (not shown). To be able to fit the engine 62 in between the side members 80, the separation between the side members 80 is generally larger than that conventionally found on existing semi-trailers. However, the standard width of the wheeled axles is kept the same to keep the vehicle roadworthy. This has necessitated mounting the power trailer suspension under the side members rather than on their side. The engine 62 is supplied combusting air through an air inlet 96. The air is then fed through to the engine via air pipe 98 and through appropriate filters. Exhaust gases are vented from the engine through exhaust outlet 100.

The cooling means 64 includes a radiator 102 to assist in cooling the engine by using an appropriate cooling fluid or coolant. In this particular advantageous embodiment the engine cooling means or the radiator 102 is mounted at the rear of the power trailer on top of frame extension 76 that extends further rearwardly from the chassis 70. Typically, the length of the frame would be extended to accommodate the radiator positioned along the frame. However, the frame may very well remain the same length as in conventional trailers, but the length of the bin 66 would be shortened to provide sufficient space to accommodate the radiator.

The radiator 102 includes coolant coils mounted in a housing 106. An air fan 108 is mounted behind coils and is driven to draw air through the coils. Located in front of the coils is a grill 110 to offer some protection to the coils from damage by debris. The air fan 108 typically includes a hydraulic motor 112 driven by the supply of hydraulic fluid through conduits 114 and 116. The air fan 108 is also housed in a protective grill 118 and is supported in position by support bars 120 extending between the top and bottom of the housing 106.

Coolant is supplied to the radiator through inlet pipe 122 and back to the engine through outlet pipe 124. The significant distance between the radiator and the engine means that the length of pipes transporting the coolant is quite long. This in itself provides an advantage in that the volume of coolant for the engine system has been greatly increased as compared to conventional engine designs where the radiator is located in front of the engine. The volume of the pipes effectively acts as a large coolant store.

Located around the engine are various compartments 126 and 128 that house the necessary control and sensing equipment for the engine such as engine starting controls and diagnostic instruments. Typically these systems include communication means with the truck so that the driver is kept advised as to the general status of the power trailer engine.

Power trailer fuel tanks 130 are located above the right hand side of the rear axle assembly 78 and act as pseudo mudguards. Side-tipping hydraulic arms 132 and 134 are provided at the front and rear of the bin respectively whilst arms 136 and 138 control opening the side of the bin 66. Alternatively, the fuel tanks can be on the left hand side of the rear axle, depending on which side the tipping occurs, as required by the end user or by the local road rules.

FIG. 6 illustrates a multi-combination vehicle 135 wherein instead of a power-trailer as illustrated earlier, there is at least one "B-double" trailer 137 incorporating a power trailer 140 coupled to a trailer 142. The trailer 142 includes a rear axle assembly 144 that acts as a dolly for the power trailer 140. Power trailer 140 includes a tri-axle rear axle assembly 146, the configuration of the other components being similar to those described earlier and well known in the art. Rear axle assembly 144 is a quad-axle assembly. It is however to be understood that the assembly may have less axles than shown, such as a tri-axle assembly. A B-double trailer 137 configuration has been found to provide improved directional stability. In the case of a long multi-combination vehicle, this enables the operator to assemble a multi-combination vehicle having a total combination approaching up to 10 trailers and power trailers.

The above description illustrates a multi-combination vehicle 135 having multiple power trailers and a single prime mover or truck. We now discuss the operating control systems of such a multi-combination vehicle. For ease of understanding we will discuss an embodiment where there is only one truck and one power trailer. It is however to be understood that the control system may equally well apply to one or more power trailers and it is not intended to limit the present application to a multi-combination vehicle having only one power trailer.

The throttle control of the engines of a truck and the power trailer depend on the configuration of the transmission system of the truck and the transmission system of the power trailer. Since a driver would not be able to control manual transmission systems of two engines, the transmission system of the power trailer is an automatic one.

Each of the engines includes engine on-board computer management systems, which not only measure a number of parameters such as the torque, fuel injected, and the engine rpm's (revolutions per minute) but also enable a throttle input to be used to drive the engine. Whilst its own throttle may control each engine separately those skilled in the art would appreciate the difficulty of controlling such a multi-combination vehicle where there were separate throttles and typically the power trailer engine is operated assuming a load all the time, that is, at the throttle required to maintain the operational speed of a fully loaded vehicle. This is undesirable for many reasons including stability of the multi-combination vehicle as well as fuel consumption.

Figure 7:
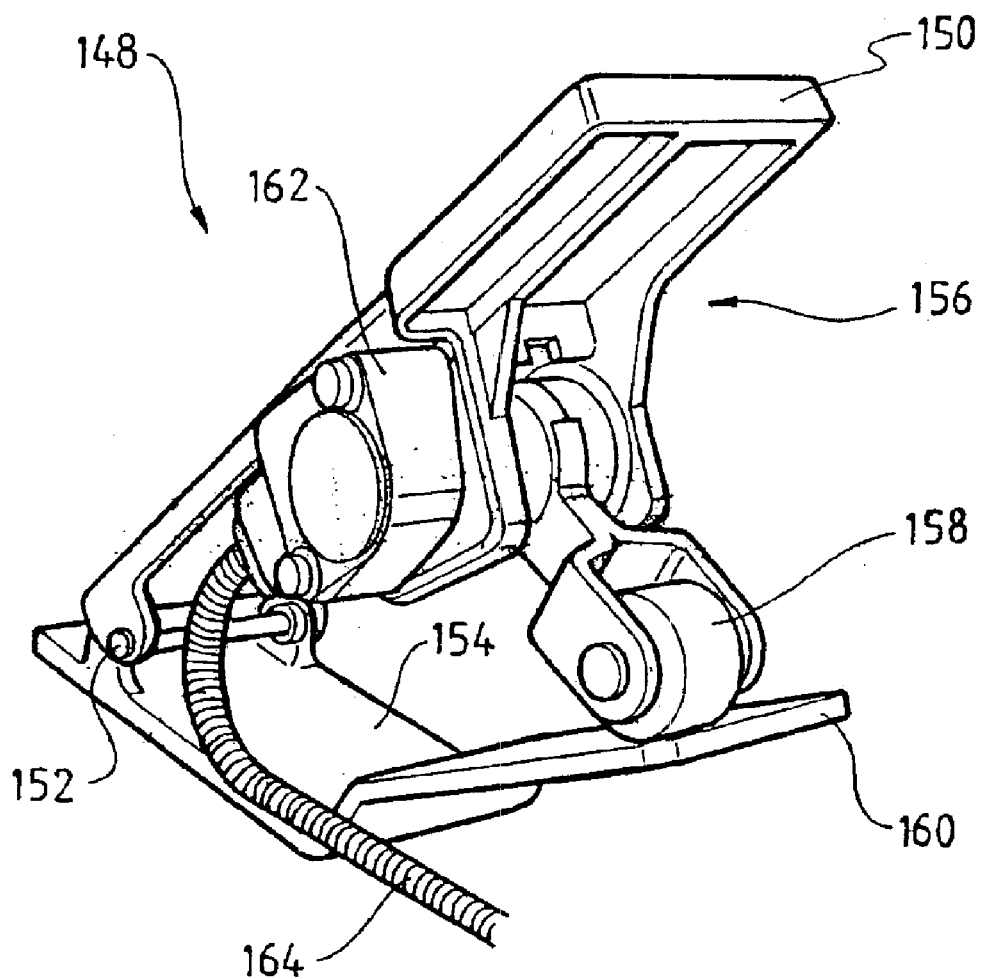
FIG. 7 is a rear perspective view of an electronic throttle control, according to the invention.

If the truck transmission system is a manual one then there must be separate throttle controls since the gearing of the transmission systems would work against each other. However in the case where the engine and transmission system configuration of both the truck and the trailer are automatic, it has been discovered by the present applicant that such a configuration may be controlled by one throttle unit 148 only as illustrated in FIG. 7.

The throttle unit, or electronic throttle control 148 includes a pedal 150 pivoted at 152 on a base 154. A biasing means 156 having a rotatable wheel 158 is pivotably attached to the pedal and rotates along arm 160 to provide resilience for the pedal in operation. Attached to the side of the pedal is a housing 162 housing a potentiometer, a shaft operatively connecting the pedal 150 and the potentiometer so that as the pedal is depressed the potentiometer is rotated providing a variable voltage output.

Figure 8:
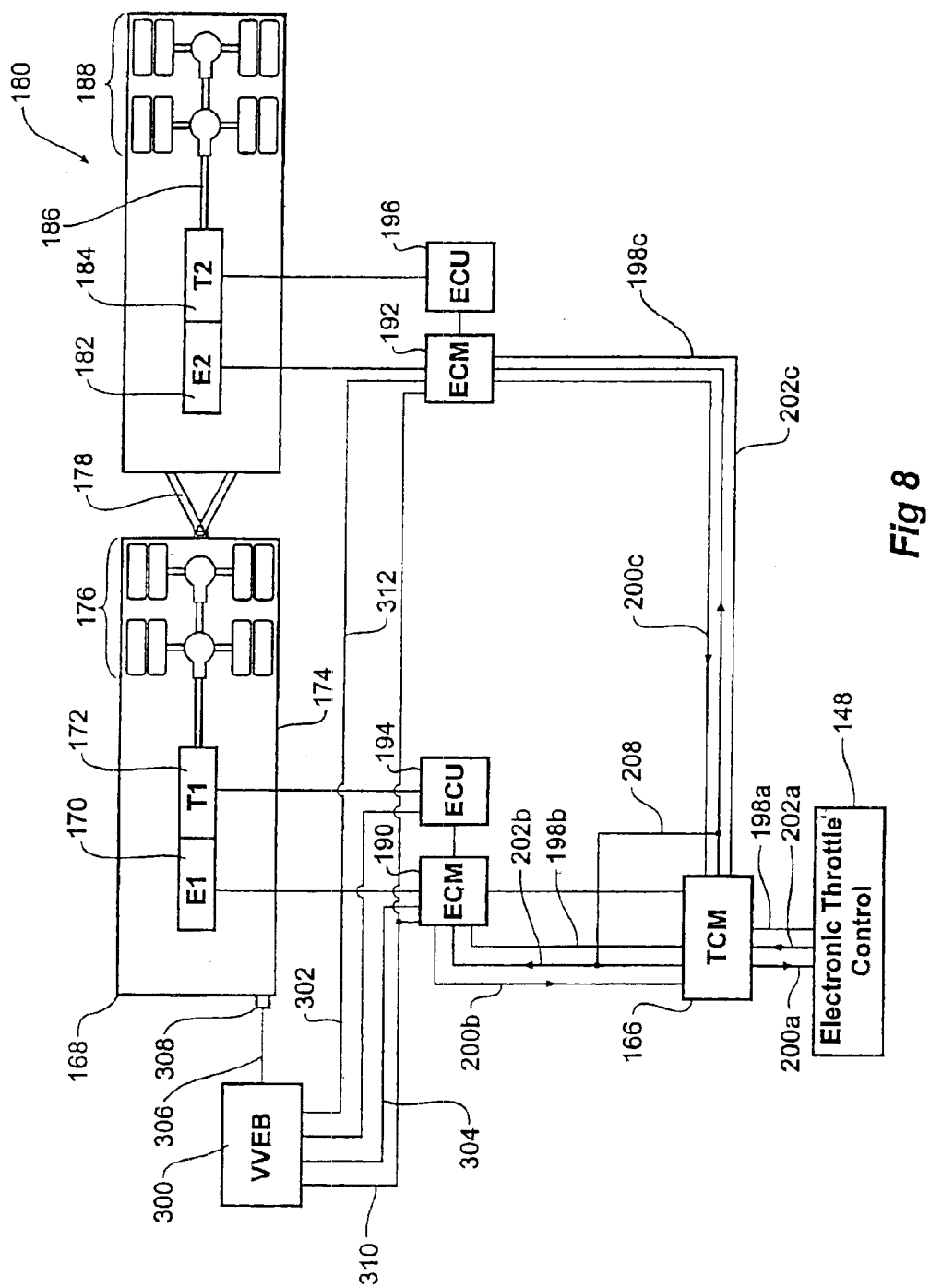
FIG. 8 is a schematic illustration of one embodiment of a system for the variable velocity emergency braking of a multi-combination vehicle, according to the invention.

Illustrated in FIG. 8 is a schematic illustration of a multi-combination vehicle and system, according to one embodiment of the present invention, for the variable velocity emergency braking control of multiple engines of the multi-combination vehicle. The throttle pedal 148 is electronically connected through cable cluster 164, as shown in FIG. 7, to a throttle control module (TCM) 166 and is typically provided power from a truck engine control module (ECM) 190. As discussed above, should the truck engine and its power system fail for whatever reason, an alternative source of power needs to be provided to the electronic throttle control 148 to enable the operator to provide a throttle input to the power trailer engine. The TCM 166 enables the operator to select and alternate power source for the electronic throttle control 148 so that the multi-combination vehicle can still be driven even if one of the engines were to fail. This ability allows the multi-combination vehicle to be at the very least moved out of the way so that other vehicles may use a roadway and at best still deliver any load and be driven to an appropriate area for repair.

With reference to FIG. 8, a first vehicle, typically truck 168 includes engine 170 providing power through transmission system 172 to drive shaft 174 and onto rear axle assembly 176. The truck 168 is mechanically coupled via coupling 178 to power trailer 180 having engine 182 providing power through transmission system 184 to drive shaft 186 and onto rear axle assembly 188.

Each of the engines has an associated Engine Control Module (ECM), ECM 190 coupled to engine 170, and ECM 192 coupled to engine 182. Similarly each transmission has an associated Engine Control Unit (ECU), ECU 194 coupled to transmission 172, and ECU 196 coupled to transmission 184. The ECM and ECU unit of each vehicle are connected to the vehicles' independent power supply.

As discussed earlier the electronic throttle control or pedal 148 is operatively connected to throttle control module (TCM) 166 and includes a ground 198a, power 200a, and variable throttle output 202a. The TCM is operatively coupled to the ECM 190 of the truck and ECM 192 of the power trailer. The truck ECM 190 associated with truck 168 is connected with the TCM to provide power 200b, a common ground 198b whilst receiving the throttle pedal output 202b. Similarly the power trailer ECM 192 associated with power trailer 180 is connected with the TCM to provide power 200c, a common ground 198c whilst receiving the throttle pedal output 202c.

Systems for the control of the ECM's and ECU's of the truck and trailer where there is a failure in one module or unit are the subject of the earlier identified applications and will not be discussed here further. For further information the reader is referred to these applications.

The Variable Velocity Emergency Braking module (VVEB) 300 is operatively coupled through connection 302 to the ECU 194, the ECU providing the VVEB with the vehicle speed. The VVEB 300 is also operatively connected to the ECM 190 of the truck through connection 304. Connection 306 also provides information to the VVEDB 300 about the vehicle condition through sensor 308, this to be discussed later. VVEB 300 is also operatively connected to the TCM 166 through connection 310.

In operation, the VVEB 300 is pre-programmed so that when the speed of the vehicle provided to the VVEB 300 from the ECU 194 reaches a pre-determined threshold, the VVEB 300 acts to inhibit the throttle 148 thereby cutting off the fuel supply to the engine 170. The ECM 194 then applies engine braking since fuel is no longer provided to the engine 170.

The operation of the VVEB 300 is independent of the operator or driver of the vehicle. Even if the driver is throttling the engine 170, once the pre-determined speed is reached the VVBE 300 will inhibit the throttle 148 and enable engine braking until the vehicle speed falls below the pre-determined speed at which point the engine braking is de-activated and the throttle 148 is enabled.

In a multi-combination vehicle having a power trailer, VVEB 300 also provides a control signal 312 to the ECM 192 of the power trailer instructing it to apply engine braking which it is able to do since throttle 148 that controls both the truck engine 170 and the trailer engine 182 has been inhibited.

In a preferred embodiment, the engine braking provided by the power trailer 180 is at least equal to and typically greater than the engine braking of the truck 168. Typical engine configurations provide the operator of the engine with choices as to the level of braking available, that being dependent on the number of cylinders in an engine. Thus in a six cylinder engine the manufacturer of the engine typically provides the operator with the ability to choose braking in multiples of two cylinders, that is, the engine braking is provided by 2, 4 or 6 cylinders.

The present invention, when applied to a multi-combination vehicle, provides in a preferred embodiment for the VVEB 300 operatively coupled to the ECM's 190 and 192 of the truck and the trailer engines respectively, to apply engine braking to all cylinders of the trailer engine 182 and only to some cylinders in the truck engine 170. In a six cylinder engine, all six cylinders are used for the trailer engine brake whilst only four cylinders are used for the truck engine brake. By selecting the trailer engine 182 to brake at a greater level than that of the truck engine 170, the stability of the multi-combination vehicle under braking is optimised.

Typically the speed at which the VVEB 300 activates is selected depending on the operating conditions under which the vehicle is to operate. For example, in underground mines the typical speed preset with the VVEB 300 is some 35 km/h. The preset speed is not one that can be altered by the driver but requires the VVEB 300 to be re-programmed thereby removing the opportunity for the driver to tamper with it.

Under some circumstances it may be desirable to achieve maximum braking in such a multi combination vehicle. The operator of the vehicle can select this so that both the truck engine 170 and trailer engine 182 provide maximum engine braking, or brake on all the engine cylinders.

Figure 9:
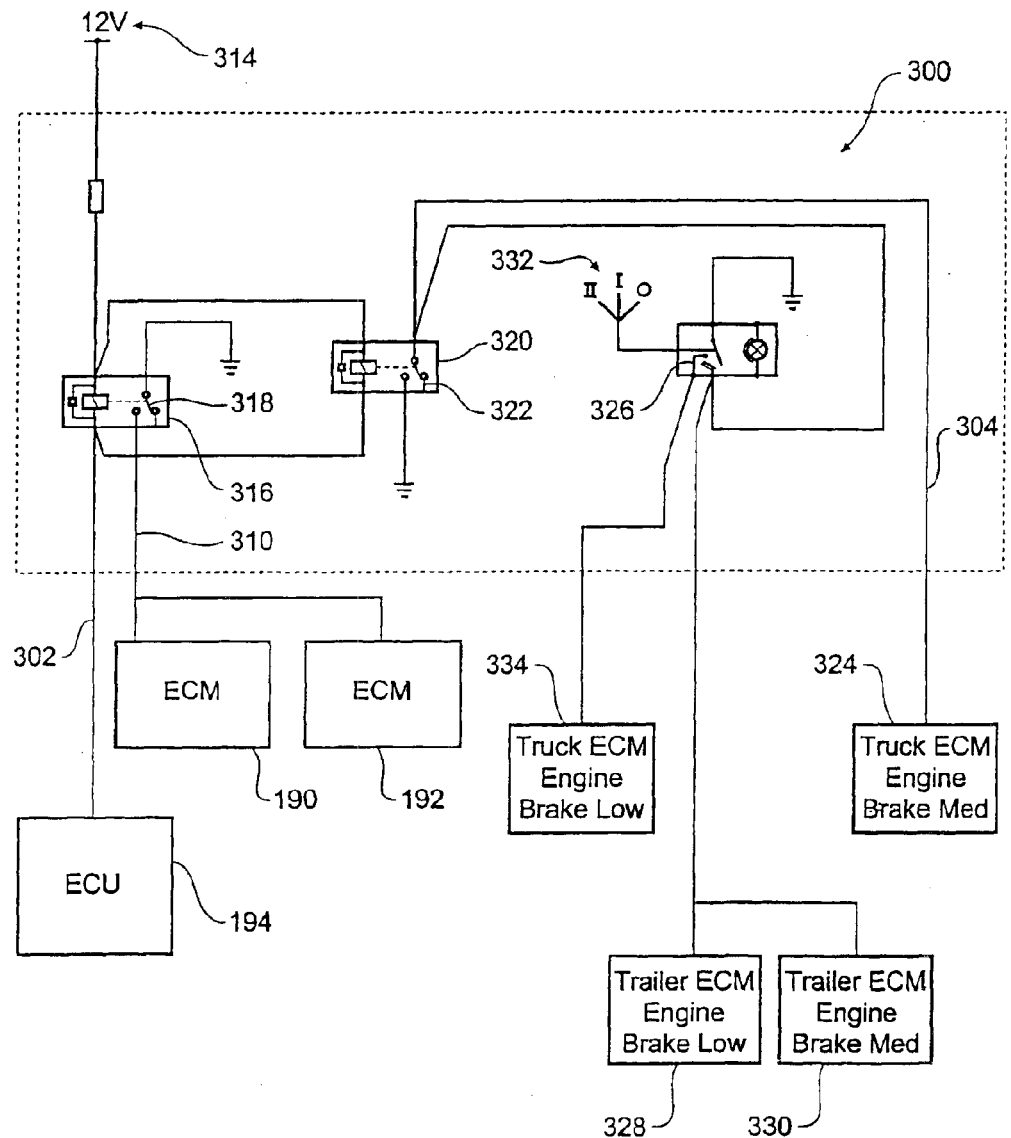
FIG. 9 is a schematic illustration of the variable velocity emergency braking (VVEB) module shown in FIG. 8, according to the invention.

FIG. 9 illustrates in more detail the engine braking circuit. Electrical power is to provide the VVEB 300 from standard 12 Volt supply 314. The truck ECU 194 provides a signal 302 related to the speed of the vehicle to relay 316 that when energized activates switch 318 that grounds the TCM 166 effectively inhibiting the throttle. Relay 316 also energizes relay 320 that activates switch 322 engaging the truck ECM engine brake medium 324 (i.e. four cylinders) and engaging the trailer ECM to apply low braking 328 (i.e. two cylinders) as well as medium braking 330 (i.e. four cylinders) resulting in engine braking provided by all of the cylinders of the trailer engine or maximum braking.

The VVEB applies engine braking independent of the operator of the vehicle. However, the operator can apply engine braking using manual switch 332. The switch typically has three positions. When in position "0", no engine braking is applied. When in position "I", maximum trailer engine braking and medium truck engine braking is applied, and when in the "II" position both engines have maximum braking on. Maximum braking in the truck engine is achieved by engaging the additional two cylinders 334, four of the cylinders (in a six cylinder engine) already engaged when selecting switch 332 to "I". This engine braking is therefore independent of the vehicle speed and may be selected by the driver who may at times require the vehicle to slow down under controlled braking. Those skilled in the art will appreciate that even if the VVEB has applied engine braking the driver can increase it manually by engaging full engine braking in the truck.

If the selector switch 332 is on "0" and the vehicle exceeds the speed set for engagement of the VVEB engine braking is applied until the vehicle speed falls below the set speed. Once the speed of the vehicle has dropped below this set speed the engine braking is turned off and the throttle is once again enabled.

It is to be understood that in a preferred embodiment various safety features may further be incorporated into the present invention. For example, the VVEB may only be enabled when certain conditions are met, those conditions typically ones where excess speed is clearly undesirable. Such conditions may be provided by sensor 308 on the truck that may measure, for example, the vehicle weight, time of day, the vehicle incline and the relative orientation of the trailer to the truck. In fact multiple sensors on the truck may be actively connected to the VVEB so that each sensor separately controls the speed at which the VVEB engages engine braking. For example, if the vehicle is not travelling on an incline, it is day time, and the vehicle is not loaded, the VVEB may be pre-set to operate the engine braking at 50 km/h since this operating configuration would imply the vehicle travelling aboveground unloaded. If however, the vehicle was moving down an incline, it may be preferred that the engine braking is applied if the speed is greater than 35 km/h. If the vehicle is also loaded then the preferred speed at which the VVEB acts may even be 30 km/h.

Similarly, if the vehicle is turning, as measured by the relative longitudinal orientation between the truck and the trailer, the greater the turn the smaller the threshold speed at which engine braking is applied.

Those skilled in the art will appreciate that the present invention complements and further enhances the multi-combination vehicles whose details were described in the United States and International Applications discussed earlier and that provide significant advantages and cost savings when hauling ore.

In summary, a typical engine that produces 600 horsepower as an output power is also equal to or up to equivalent to 600 horsepower retardation. This is simply more than taking the foot of the throttle for the engine effectively turns into a compressor. By ensuring that the trailer engine brakes using more cylinders, assuming the engines are equal, the trailer acts as an anchor providing stability to such a multi-combination vehicle.

Typically there are three stages of braking in a 6-cylinder engine, each braking being a multiple of two cylinders. In this embodiment, when an over-speed is detected the truck engine brakes using 4 cylinders whilst the trailer engine brakes using all 6 cylinders. By braking harder with the trailer jack, knifing is avoided and the multi-combination vehicle pulls up straight. At the same time that the engine braking is applied the throttle is inhibited.

The speed at which engine braking is applied can depend on many conditions that can be pre-set into the control unit including the vehicle inclination (using a mercury switch), weight (by sing load cells in the air suspension), speed (by using an output form the transmission), time of day (using a clock or a photo sensor when working above ground). Furthermore a calibrated altitude meter can be used to determine when the vehicle is above or below ground, since the underground speed needs to be kept below a maximum.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A braking system for the control of vehicle speed, the vehicle including an engine having a first plurality of engine cylinders, an electronic throttle, electrical power source and engine brake adapted to provide engine braking, the system comprising:

an electronic control unit, said electronic control unit being in communication with said engine electrical power source, engine throttle and engine brake; and a speed sensor adapted to measure the speed of said vehicle and communicate said measured vehicle speed to said electronic control unit, wherein when said measured vehicle speed is greater than a pre-determined vehicle speed threshold, said electronic control unit disables said engine throttle and applies said engine brake using a second plurality of said engine cylinders, said second plurality of engine cylinders being less than said first plurality of engine cylinders, and wherein when said measured vehicle speed equals said pre-determined vehicle speed, said electronic control unit enables said engine throttle and disengages said engine brake.

2. The braking system of claim 1, wherein when said measured vehicle speed is less than said pre-determined vehicle speed, said electronic control unit enables said engine throttle and disengages said engine brake.

3. The braking system of claim 1, wherein said electronic control unit includes a manual override control, said manual override control being adapted to enable an operator of said vehicle to apply variable engine braking independent of the vehicle speed.

4. The braking system of claim 3, wherein said manual override has at least first and second selections.

5. The braking system of claim 4, wherein said first selection provides engine braking using a third plurality of engine cylinders, said third plurality of engine cylinders being less than said first plurality of engine cylinders.

6. The braking system of claim 4, wherein said second selection provides engine braking using said first plurality of engine cylinders.

7. A braking system for the control of vehicle speed in a multi-combination vehicle having at least two engines that are controlled by a single electronic throttle, each engine being operable to effect engine braking and having a first plurality of engine cylinders, an electrical power source and an engine brake, the system comprising:

an electronic control unit, said electronic control unit being in communication with at least one of said engines' electrical power source, said electronic throttle and said engine brake of each of said engines; and a speed sensor adapted to measure the speed of said vehicle and communicate said measured vehicle speed to said electronic control unit, wherein when said measured vehicle speed is greater than a pre-determined vehicle speed threshold, said electronic control unit disables said engine throttle and applies at least one of said engine brakes of said engines.

8. The braking system of claim 7, wherein said multi-combination vehicle includes a powered truck and powered trailer, said powered truck including a first engine and said powered trailer including a second engine, said first and second engines having a first plurality of engines cylinders.

9. The braking system of claim 8, wherein said engine braking is provided by said first engine of said powered truck and said second engine of said powered trailer.

10. The braking system of claim 9, wherein said engine braking is provided by using said first plurality of engine cylinders of said second engine and a second plurality of engine cylinders of said first engine, said second plurality of engine cylinders being less than said first plurality of engine cylinders.

11. The braking system of claim 9, wherein said electronic control unit includes a manual override control, said manual override control being adapted to enable an operator of said vehicle to apply said engine braking independent of the vehicle speed.

12. The braking system of claim 11, wherein said manual override control has first and second selections.

13. The braking system of claim 12, wherein combined said first and second selections provides said engine braking by using said first plurality of engine cylinders of said second engine.

14. The braking system of claim 12, wherein said first selection provides said engine braking using a third plurality of engine cylinders of said first engine, said third plurality of engine cylinders being less than said first plurality of engine cylinders.

15. The braking system of claim 12, wherein said second selection provides said engine braking using said first plurality of engine cylinders of said first engine.

16. The braking system of claim 7, further including an inclination sensor adapted to measure the vehicle forward inclination and weigh the pre-determined speed at which said engine braking is applied with increasing values of inclination.

17. The braking system of claim 7, further including a light sensor adapted to detect ambient light and weigh the pre-determined speed at which said engine braking is applied as a function of ambient light conditions.

18. The braking system of claim 7, further including a weight sensor adapted to determine the total weight of at least said powered truck and weigh the pre-determined speed at which said engine braking is applied as a function of said weight of said truck.

19. The braking system of claim 7, wherein said pre-determined speed is set at 35 km/h.

* * * * *

UNITED STATES PATENT AND TRADEMARK OFFICE
CERTIFICATE OF CORRECTION

PATENT NO. : 6,843,351 B2  Page 1 of 1
APPLICATION NO. : 10/637902
DATED : January 18, 2005
INVENTOR(S) : Mark J. Slummor It is certified that error appears in the above-identified patent and that said Letters Patent is hereby corrected as shown below:

Please insert assignee item [73], James W. Cooper on the title page.

Signed and Sealed this

Thirtieth Day of January, 2007

JON W. DUDAS
*Director of the United States Patent and Trademark Office*